May 22, 1951  C. J. WALKER ET AL  2,554,228
GAS TURBINE POWER PLANT
Filed May 17, 1949
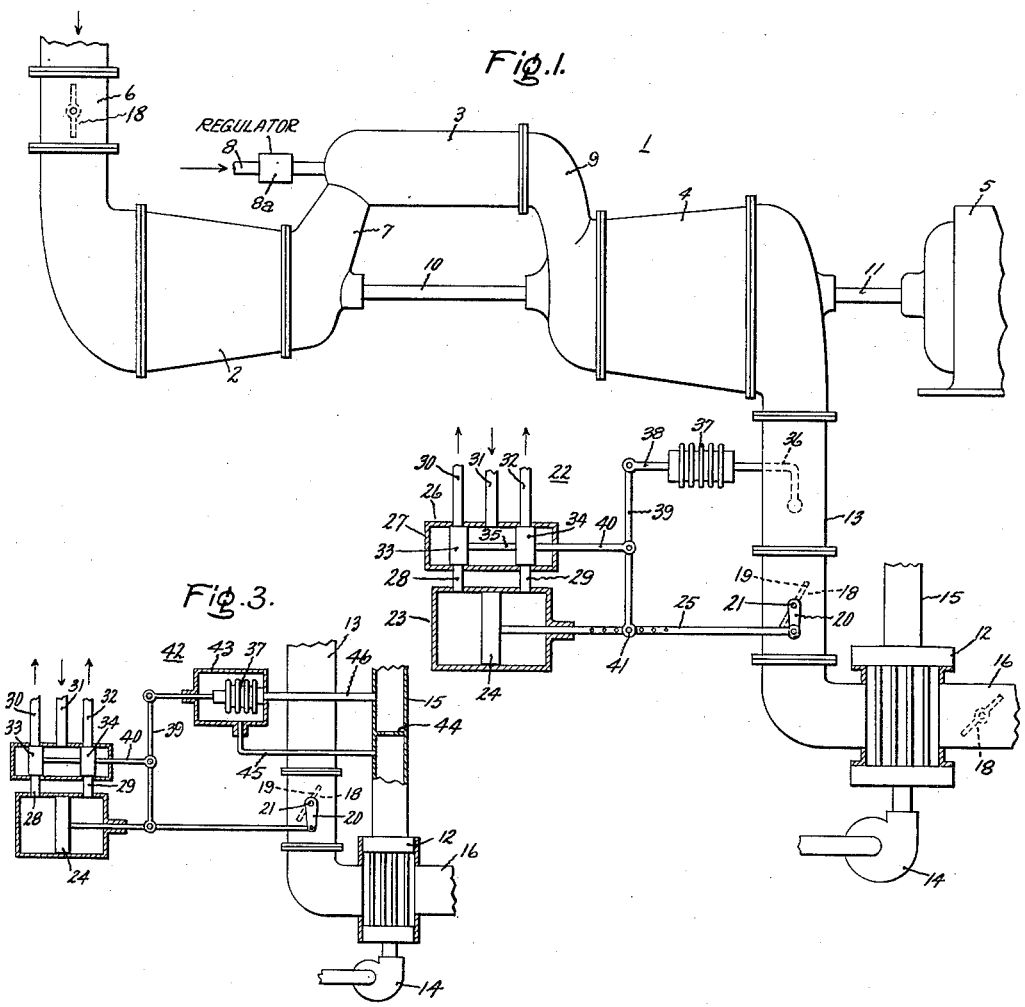
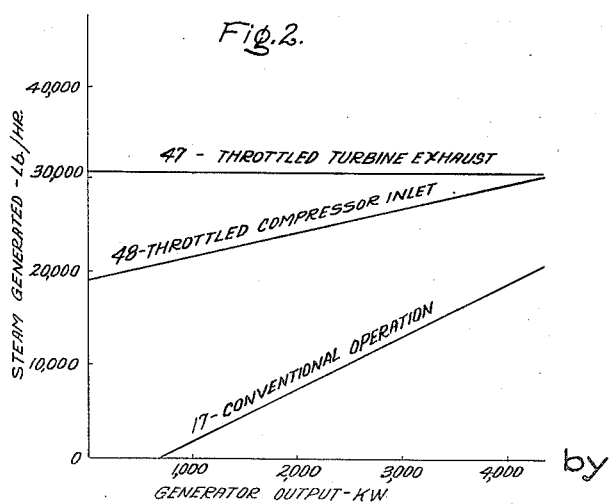
Inventors:
Chapman J. Walker,
George R. Fusner,
by Rowell S. Mack
Their Attorney.

Patented May 22, 1951

2,554,228

UNITED STATES PATENT OFFICE 2,554,228

GAS TURBINE POWER PLANT

Chapman J. Walker and George R. Fusner, Schenectady, N. Y., assignors to General Electric Company, a corporation of New York Application May 17, 1949, Serial No. 93,718

4 Claims. (Cl. 60—49)

1

This invention relates to elastic fluid turbine power plants and more particularly to an arrangement for adjustably controlling the exhaust gas temperature of a gas turbine for varying power loads on the turbine and varying ambient temperatures.

The use of a gas turbine has frequently been proposed as a combined source of power and heat, the heat to be used directly in a process or the like or as a supply to a heat exchanger such as an unfired boiler.

While such an arrangement may be satisfactory at the design load and design ambient temperature of the turbine, the normal characteristics of gas turbines are such as to seriously limit their practical utility in producing a required amount of heat to the particular use over a wide range of turbine load and ambient temperature. That is, the temperature of the exhaust gas of a gas turbine is a function of the power load and the ambient temperature, and at low loads or low ambient temperatures the turbine exhaust gas temperature is so low as to seriously limit the use which may be made thereof.

It is, therefore, an object of this invention to provide an arrangement for adjustably controlling the turbine exhaust gas temperature to produce a quality of exhaust gas suitable for the desired use thereof.

It is a further object to provide an arrangement producing the desired quality of exhaust gas independently of the power load on the turbine or the ambient temperature thereof.

In general, our invention comprises an arrangement for throttling the flow of exhaust gas in the turbine to increase the temperature of the exhaust gas independently of the turbine load. In one aspect of the invention, the arrangement for throttling the exhaust gas flow comprises a throttling device applied on the exhaust side of the turbine, and in a second aspect of the invention the arrangement for throttling the exhaust gas flow comprises a combination of throttling devices one applied to the compressor inlet of the turbine and the other on the exhaust side of the turbine.

For a complete understanding of our invention, reference should be had to the following specification and the accompanying drawing in which like members are given the same character reference throughout. In the drawing, Fig. 1 is an elevational view partly in section of a simple open cycle gas turbine and an unfired steam boiler showing the application of our invention thereto, Fig. 2 is a chart of generated steam and electri-

2 cal generator output used to explain the operation of our invention, and Fig. 3 is a view partly in elevation and partly in cross section of a portion of Fig. 1 showing a modification of a control for our invention.

Referring to the drawing, we have shown in Fig. 1 for the purpose of illustrating our invention a simple open cycle gas turbine power plant 1 comprising a compressor 2, a combustion chamber or "combustor" 3, a gas turbine 4, and an electrical generator 5. In this arrangement, air is admitted through a pipe 6 to the compressor 2 where it is compressed and delivered to the combustion chamber 3 through a connecting pipe 7. At the same time, fuel oil is delivered through a pipe 8 to the combustion chamber 3. The mixture of compressed air and fuel oil are burned in the combustion chamber 3 to produce a hot gas which is delivered to the turbine 4 through a pipe 9. Turbine 4 is operated by the hot gas so supplied and is used to drive the compressor 2 and generator 5 through the respective coupling shafts 10 and 11.

To control the speed of turbine 4, a conventional gas turbine regulator indicated diagrammatically at 8a is provided. The governor 8a regulates the flow of fuel oil through pipe 8 to the combustion chamber 3 in response to changes in the speed and other operating conditions of turbine 4. If the speed of turbine 4 is decreased by placing additional load on the turbine or by a decrease in ambient temperature, the regulator automatically increases the supply of fuel oil to combustion chamber 3 to maintain a desired constant speed of the turbine. The details of the complex regulator 8a are not material to an understanding of the present invention and are therefore not disclosed herein. It may be noted however that this regulator may be of the type disclosed in the copending applications of N. E. Starkey, C. B. Lewis, and M. A. Edwards, Serial No. 84,416, filed March 30, 1949, H. M. Ogle, D. E. Garr, and M. A. Edwards, Serial No. 697,058, filed September 14, 1946, or M. A. Edwards, D. E. Garr, and H. M. Ogle, Serial No. 605,960, filed July 19, 1945.

Also in the arrangement shown in Fig. 1, the exhaust gas from the turbine is supplied to a heat exchanger, which we have shown as an unfired steam boiler 12, through an exhaust pipe 13 of the turbine 4. The exhaust gas thus supplied to the boiler 12 is used to heat water supplied to the boiler through a pump 14 to produce steam in the boiler, the steam being taken from the boiler through steam pipe 15. The exhaust gas after passing through the boiler 12 is exhausted from the boiler through pipe 16.

In the arrangement described above, the amount of heat delivered from the turbine 4 to the boiler 12 depends upon the temperature of the exhaust gas of the turbine. Moreover, the characteristics of a gas turbine are such that the temperature of the exhaust gas thereof varies directly as function of the ambient temperature of the air supplied to the compressor and the turbine load, and therefore the amount of heat supplied to the boiler 12 varies in the same manner. This characteristic of the gas turbine limits its use as a source of heat where a constant or a minimum supply of heat is required and the load and ambient temperature of the turbine must for practical reasons vary.

For example, assuming an ambient temperature of 0° F. and assuming generator 5 to be designed for 3,500 kw. at 0° F. ambient temperature, and boiler 12 to be designed to produce 200 pounds per square inch gage steam with feed water entering the boiler at 212° F., then the amount of 200 pounds per square inch gage steam generated by boiler 12 for various loads on the generator 5 varies in accordance with curve 17 of Fig. 2 which will hereinafter be referred to as the conventional operation curve.

From this curve it may be seen that at the design load of the generator, that is, 3,500 kw., the steam generated by boiler 12 is about 15,000 pounds per hour at 0° F. ambient temperature. However, when the generator load is decreased, then the turbine can no longer supply the necessary heat to maintain the 15,000 pounds per hour of steam required. Therefore, this conventional arrangement fails where the turbine load and ambient temperature are low.

To maintain a higher turbine exhaust gas temperature and thereby maintain the required production of steam in boiler 12, a further characteristic of the gas turbine may be used. That is, if the ratio of the inlet pressure to the exhaust pressure of the turbine is lowered, then the gas in the turbine must become hotter to supply the same turbine load and consequently the temperature of the exhaust gas is increased. That is, by lowering the ratio of inlet to outlet pressure of the turbine 4, the turbine tends to slow down and the regulator 8a automatically increases the supply of fuel oil to the combustion chamber 3 to provide the required increase in temperature of the turbine gas necesary to carry the turbine load at the reduced pressure ratio. However, by increasing the temperature of the gas in the turbine, the temperature of the exhaust of the turbine is also increased. Therefore, if the temperature of the exhaust gas of the turbine is reduced below a value necessary to produce a required amount of steam from boiler 12, then by lowering the ratio of inlet to outlet pressure of the turbine, it is possible with the cooperation of the fuel regulator 8a to re-establish the required temperature of the turbine exhaust gas to produce the required supply of steam from boiler 12.

In accordance with one aspect of our invention, the gas pressure ratio of the turbine is controlled by an adjustable throttling device positioned on the exhaust side of the turbine to control the back pressure thereon. Thus the inlet gas pressure being substantially constant, by controlling the exhaust pressure the ratio of the inlet to exhaust pressure is controlled to govern the exhaust gas temperature. Any suitable throttling device positioned on the exhaust side of the turbine may be used for this purpose. For example, a throttling device indicated generally at 18 comprising a butterfly valve plate 19 positioned in the turbine exhaust pipe 13 between the turbine 4 and the boiler 12 and rigidly connected to a lever 20 by a pivot pin 21 passing through an aperture in the pipe 13 may be used. Throttling device 18 may also, if desired, be located in the exhaust pipe 16 of the boiler 12 indicated.

The effect of throttling device 18 may be controlled in response to the exhaust gas temperature or in response to the flow of steam from boiler 12 by any suitable device either manual or automatic. For example, to control the effect of throttling device 18 in response to the exhaust gas temperature, a control device 22, as shown in Fig. 1, may be used. In device 22, a double acting fluid motor 23 is provided with a piston 24 arranged to rotate the valve 19 through the medium of a rod 25 pivotally connecting the piston 24 and the lever 20.

To control the operation of the fluid motor 23, a control mechanism 26 is provided. Control mechanism 26 comprises a hollow cylinder 27 connected to the fluid motor 23 by two spaced pipes 28 and 29, three additional spaced pipes 30—32 connected to the cylinder 27 as shown in Fig. 1, and two spaced pistons 33 and 34 slidably arranged in the cylinder 27 and connected by a rod 35.

Control mechanism 26 is actuated and controlled in response to the temperature of the turbine exhaust gas in pipe 13 by a sealed tube 36 projecting into the interior of pipe 13 and connected to one end of a bellows 37 to form intercommunication of the interiors of the tube and bellows for the passage of an expansible gas therebetween. The other end of bellows 37 is connected by pivotally connected arms 38—40 to the piston 34 and rod 25 as shown.

In operation, when the turbine exhaust temperature is lowered, as, for example, by a reduction in load on generator 5 or by a decrease in ambient temperature, the gas in tube 36 contracts to shorten the over-all length of bellows 37 and arm 39 is pivoted in a clockwise direction about its end 41. In so pivoting, arm 39 moves the pistons 33 and 34 to the right thereby allowing fluid under pressure to be amitted through pipe 31 to the control cylinder 27 and thence through pipe 29 to the right side of piston 24. At the same time, the back pressure on the left side of piston 24 is exhausted through pipes 28 and 30. Thus piston 24 is moved to the left.

When piston 24 moves to the left a certain distance, its movement causes the pivoted end 41 of rod 39 to move to the left and through arms 39 and 40, pistons 33 and 34 are returned to the position shown in Fig. 1 and piston 24 remains in the position thus established. The effect of moving piston 24 to the left is to close the valve 19 in a clockwise direction thereby increasing the back pressure on turbine 4, lowering the gas pressure ratio therein, and reducing the turbine output. The turbine governor 8a then admits more fuel to the turbine in order to re-establish the required normal rated speed, with a consequent increase in exhaust gas temperature to a desired value thereof. Should the exhaust gas temperature become higher than desired, pistons 33 and 34 are moved to the left in response to expansion of gas in tube 36, and the fluid under pressure is admitted through pipe 31 and 28 to move the piston 24 to the right and lower the back pressure on the turbine 4. Thus an arrangement responsive to exhaust gas temperature is provided to maintain a desired exhaust gas temperature for varying conditions of load and ambient temperature.

To control the exhaust gas temperature in response to the flow of steam from boiler 12, a throttling valve control device 42, as shown in Fig. 3, may be employed. Device 42 is similar in structure and operation to device 22 described except for the connections and arrangement of bellows 37. Bellows 37 in device 42 is enclosed in a housing 43, as shown in Fig. 3, and operates in response to a pressure drop across an orifice plate 44 located in the steam boiler pipe 15. That is, fluid under pressure in the portion of pipe 15 between the orifice 44 and the boiler 12 is supplied through a pipe 45 to the interior of housing 43 to compress the bellows 37, and fluid under pressure from the other side of orifice 44 is supplied through a pipe 46 to the interior of the bellows 37 to expand the same. Device 42 then differs from device 22 in that it operates in response to the rate of flow of steam rather than in response to the temperature of the exhaust gas supplied to the boiler.

So far we have described one aspect of our invention, in which the temperature of the exhaust gas of the turbine is controlled by placing a throttling device in the exhaust of the turbine to increase the back pressure thereof and decrease the pressure ratio.

In a second aspect of our invention, the pressure ratio is controlled by a combined effect of increasing the back pressure on the turbine and reducing the compressor inlet pressure. That is, two throttling devices such as 18 are positioned one in the exhaust pipe 13 and one in the inlet pipe 6 of the compressor 2, as indicated in Fig. 1. In this modification of our invention, any suitable control devices such as devices 42 or 22 may be used to operate the throttle devices.

To show the advantages of our invention, attention is again directed to Fig. 2. It will be remembered that in Fig. 2 curve 17 represents the conventional operation of power plant 1 under an assumed set of conditions including 0° F. ambient temperature and a varying electrical load on the generator 5. Assuming the same conditions as applied to curve 17 and applying a throttling device in the exhaust of turbine 4, as previously described, then the steam generated by boiler 12 may be maintained substantially constant at 31,000 pounds per hour, as shown in curve 47, regardless of changes in load on generator 5.

Moreover, the steam generated by boiler 12 may be maintained constant or varied at will by adjusting the throttling device 18 for any other value of generated steam up to a maximum of 31,000 pounds per hour. Comparing curve 47 with the conventional curve 17, it may be seen that at the design load of the generator 5 the steam generated by boiler 12 may be increased from about 15,000 pounds per hour under conventional operation to about 31,000 pounds per hour with the throttled exhaust arrangement of this invention.

To show the effect under the same assumed conditions of applying a combination of throttling devices one on the exhaust side of the turbine and one on the inlet side of the compressor, which arrangement is a modification of our invention, we have shown a curve 48 which indicates the steam generated with a throttling device in the compressor inlet. Curve 47 does not represent the operation of our combined throttling arrangement. It is the upper limit of such an arrangement. That is, a combination throttling of turbine exhaust and compressor inlet would produce a curve somewhere between curves 47 and 48 depending upon the relative amount of throttling at each point. Such a curve, however, lies between curves 47 and 48 thereby indicating a considerable increase in steam generated from the boiler 12 under varying conditions of generator load. Also the throttling devices may be controlled to produce this maximum amount of steam in the boiler or to maintain any other desired rate of steam generation, as for example, 15,000 pounds per hour. Under conventional operation as indicated by curve 17, boiler 12 receives sufficient heat from the turbine 4 to supply 15,000 pounds per hour of steam only at the design load, 3,500 kw., of the generator or more. At other generator loads, the gas turbine could not supply sufficient heat to produce the 15,000 pounds per hour of steam.

While the curves used to illustrate the advantages of our invention have assumed a constant ambient temperature, it will be obvious to those skilled in the art that the same advantages apply should the ambient temperatures be varied or should both the ambient temperature and the turbine load vary.

Also, from the above disclosure it will be obvious to those skilled in the art that the fluid may be throttled at any point in the flow path, as by throttling device 18 in inlet pipe 6, in order to effect a desired increase in exhaust gas temperature. However, we have found that better results are obtained when throttling is effected in the turbine exhaust pipe.

We have, therefore, provided an arrangement for adjustably controlling the exhaust fluid temperature of an elastic fluid turbine to obtain an increase in heat therefrom.

We have also provided an arrangement for increasing the heat obtained from the exhaust fluid of an elastic fluid turbine and for controlling the value thereof to maintain a desired heat value for varying turbine loads and ambient temperature, and have therefore increased the utility of an elastic fluid turbine as a practical source of heat.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. A gas turbine powerplant having a compressor, a combustor and a turbine in series flow relation, a regulator of the type adapted to control the supply of fuel to the combustor to maintain the net turbine output constant at a desired value, heat exchanger means for utilizing waste heat in the turbine exhaust gases, and means for controlling the temperature of the turbine exhaust gas supplied to the heat exchanger comprising valve means adapted to throttle the gas flow to decrease the pressure ratio across the turbine, and means responsive to turbine exhaust temperature for positioning said valve.

2. A gas turbine powerplant in accordance with claim 1 in which the gas throttling means includes a valve at the compressor inlet.

3. A gas turbine powerplant in accordance with claim 1 in which the gas throttling means includes a valve between the turbine and the heat exchanger.

4. A gas turbine powerplant having a compressor, a combustor and a turbine in series flow relation, a regulator adapted to control the supply of fuel to the combustor to maintain a desired net power output, heat exchanger means for converting heat energy in the turbine exhaust gases, and means for controlling the temperature of the exhaust gas supplied to the exchanger comprising valve means adapted to throttle the gas flow to decrease the pressure ratio across the turbine, and servo means responsive to rate of flow of fluid from the exchanger for positioning said valve.

CHAPMAN J. WALKER.
GEORGE R. FUSNER.

REFERENCES CITED

The following references are of record in the file of this patent:

UNITED STATES PATENTS

| Number | Name | Date |
|---|---|---|
| 2,095,991 | Lysholm | Oct. 19, 1937 |
| 2,428,136 | Barr | Sept. 30, 1947 |

FOREIGN PATENTS

| Number | Country | Date |
|---|---|---|
| 444,174 | Great Britain | Mar. 13, 1936 |
| 541,307 | Great Britain | Nov. 21, 1941 |